Patented Dec. 14, 1948

2,456,462

UNITED STATES PATENT OFFICE 2,456,462

STABILIZATION OF POLYVINYL BUTYRAL RESINS

Gelu S. Stamatoff, Nutley, N. J., assignor to E. I. du Pont de Nemours & Company, Wilmington, Del., a corporation of Delaware No Drawing. Application October 16, 1944, Serial No. 558,962

5 Claims. (Cl. 260—73)

This invention relates to a process for the stabilization of polyvinyl butyral resins and, more particularly, to the production of polyvinyl butyral resins possessing a very high degree of stability towards discoloration and freedom from odorous characteristics.

Polyvinyl butyral resins which are derived from the condensation of butyraldehyde with the water-soluble hydrolysis product of polyvinyl ester or with polyvinyl alcohol, have attained a position of considerable commercial importance. Until recently the major commercial utilization of these resins has been as an interlayer material in the production of safety glass. Recently, however, other commercial uses and applications of these resins have been developed other than as interlayers for safety glass. Such applications include the use of polyvinyl butyral resins as substitutes for rubber in the production of waterproof fabrics, for use as an ingredient in the production of pressure-sensitive adhesives, and for use as films for wrapping food and the like.

Obviously, polyvinyl butyral resins produced for use as interlayer materials for production of safety glass must possess a high degree of color stability and clarity. On the other hand, certain other characteristics possessed by these products such as odor have been substantially entirely disregarded heretofore. A large majority of the new uses being developed for these resins require that the material possess not only a high degree of color stability and clarity, but likewise substantially complete freedom from any odor characteristics.

An object of the present invention is to provide a process whereby polyvinyl butyral resins may be stabilized while suspended in the form of discrete particles in a water medium, to yield a product possessing desirable color, clarity and odor characteristics. Another object is to provide a specific class of materials which may be employed in conjunction with this process to impart good color stability characteristics to the herein considered resins. Other objects will be apparent from the description of the invention given hereinafter.

The above objects are accomplished according to the present invention by suspending a crude, water-insoluble polyvinyl butyral resin, preferably in finely divided form, in a preponderantly water solution maintained at a pH of 6.0–7.5 and an alkalinity of between 100 and 200, and, preferably after the resin is substantially neutralized, dissolving in the water solution at least 0.04% by weight of the resin, of a saturated aliphatic amine having two primary amino groups, and further subjecting the resin to the action of the solution until the resin is stabilized. More specifically, the solution is agitated throughout the treatment as otherwise the resin particles would tend to settle out, and the solution is maintained at a temperature of 55°–100° C.

The herein considered polyvinyl butyral resins are those water-insoluble products obtained by the condensation of butyraldehyde with a material which is substantially identical to that produced by the hydrolysis of a polyvinyl ester of a monohydric carboxylic acid to yield a water-soluble product. These latter materials are referred to by the art as "polyvinyl alcohol" although they generally, but not necessarily, contain in addition to a preponderance of hydroxyl groups, a minor proportion of unsaponified ester groups, normally acetyl groups since polyvinyl acetate is practically always the polyvinyl ester saponified. The term "polyvinyl alcohol," as used herein, is to be understood as possessing this connotation.

Due to the method of preparation, these polyvinyl butyral resins, in their crude form before stabilization, invariably contain acid residues which must be neutralized in the course of the stabilization treatment. The process of the present invention, while applicable to these polyvinyl resins prepared by various processes, is particularly applicable to the stabilization of crude resins which have been produced by an aqueous condensation process, i. e., by the condensation of polyvinyl alcohol in a preponderantly water solution with butyraldehyde in such manner as to produce polyvinyl butyral resin in the form of finely divided discrete particles as disclosed in applicant's copending application Serial No. 479,055, filed March 13, 1943, now Patent 2,422,754, June 24, 1947. Such polyvinyl butyral resins may possess a composition containing 30% or less of hydroxyl content calculated as polyvinyl alcohol, an ester content of less than 10% calculated as polyvinyl acetate, and an acetal content of more than 60% calculated as polyvinyl butyral.

In the following examples wherein all parts are given by weight unless otherwise noted, there are illustrative specific preferred embodiments of the present invention:

*Example I*

A resin suspension resulting from the aqueous condensation of polyvinyl alcohol and butyraldehyde and comprising suspended particles of a polyvinyl acetal resin having the following approximate analysis:

| | Per cent |
|---|---|
| Polyvinyl acetate | 1 |
| Polyvinyl alcohol | 13 |
| Polyvinyl butyral | 86 | is conducted into a reaction vessel equipped with means for efficient agitation of the suspension. The resin suspension is thoroughly washed with water, in order to remove as economically as possible without chemical treatment, all water-soluble constituents, by continuously withdrawing through a filter a portion of the suspension medium while simultaneously adding and substituting therefor an equal quantity of water of a temperature of 65° C. At the conclusion of this washing procedure the resin suspension has the following approximate composition:

| | Per cent |
|---|---|
| Polyvinyl butyral resin | 10 |
| Methanol | 1 –2.5 |
| Butyraldehyde | 0.2–0.3 |
| Sulphuric acid | Trace |
| Acetic acid | Trace |
| Water | Remainder |

1.0%, by weight of the acetal resin in the suspension, of methyl acetate is added to the suspension and is followed by about 0.75% of sodium hydroxide dissolved in a small quantity of water. The addition of the sodium hydroxide is accomplished gradually over a period of about two minutes and in such manner as to maintain the hydrogen ion concentration of the suspension between a pH of about 6.0 and 7.5, and not as high as 8.0 as measured by a glass electrode. The alkalinity of the suspension as hereinafter defined will be found to be of a value between 100 and 200. The resin suspension is then heated to 85° C. and allowed to agitate for fifteen minutes, at the end of which time the acid residues in the resin are substantially neutralized and 0.1% of diethyl cyclohexylamine, by weight of the acetal resin, is added over a period of two to three minutes and is followed in five minutes by 0.1% of ethylenediamine by weight of the acetal resin.

The stabilization of the resin is then completed by continuing the agitation for thirty-five minutes during which time the temperature is maintained at about 85° C. The resin contained in the suspension is then washed to a final alkalinity of between 15 and 20 and the resin is isolated according to established practice. The dry powdered resin thus produced possesses substantially no odor and is characterized by the fact it yields excellent results when subjected to the "heat stability" and "chip" tests described below.

In another case conducted in a fashion similar to that given above, with the exception that the pH of the water solution is allowed to attain a value of 8.5, a polyvinyl butyral resin product is isolated from the water solution. The resin so treated, although possessing good color stability as measured by the "heat stability" and "chip" tests possesses a strong, disagreeable, characteristic odor.

In still another case conducted in a manner analogous to that given above, but in which the ethylenediamine is omitted and in which the pH is maintained between 6 and 7 throughout the treatment, a resin product is isolated which, although possessing good characteristics with respect to the "chip" test, failed with respect to the "heat stability" test.

In the above example and throughout the specification, the "heat stability" test consists in placing about 1 gram of the resin upon a glass plate 2 inches by 3 inches in dimensions, evenly and thinly distributing the resin contained thereon and thereafter placing the glass plate and the resin in a mechanical convection oven maintained at a temperature of 125° C., and allowing the resin to remain there for four hours. To pass this test the resin should exhibit substantially no color change or at most a change to a very slight cream color upon being subjected to this test. If the resin develops a yellow color or some deeper shade, for example, a brown color, the resin fails the test.

The second test mentioned above is called the "chip" test and consists in placing 10 grams of the resin in a 2 inch compression mold and subjecting the same to a pressure of 2500 lbs. per square inch at a temperature of 185° C. for two minutes. To pass this test satisfactorily, the resin chip, when removed from the die, should be substantially colorless and clear. If the molded chip is characterized by color greater than a very light yellow or possesses a haze, it fails this test.

*Example II*

A polyvinyl butyral resin suspension containing a resin of the following composition:

| | Per cent |
|---|---|
| Polyvinyl acetate | 1 |
| Polyvinyl alcohol | 19 |
| Polyvinyl butyral | 80 | is stabilized by a procedure similar to that of Example I, except that sodium bicarbonate is employed in lieu of the methyl acetate and sodium hydroxide of Example I in order to adjust the pH and alkalinity. The product thereby obtained possesses good color stability and odor characteristics.

*Example III*

1,000 parts of a polyvinyl butyral resin slurry having a composition approximately the same as that indicated in Example I, are charged into a suitable reaction vessel equipped with means for efficient agitation. Sufficient sodium bicarbonate is added to the agitated suspension to impart an alkalinity of 100 to the same. The pH of the resulting solution at this point is found to be about 6.8. This resin suspension is then heated for fifteen minutes at 85° C. while vigorously agitated after which 0.07 part of diethylenetriamine are added. The suspension is then washed and isolated as indicated in Example I. The resulting polyvinyl butyral resin possesses no detectable odor characteristics and exhibits good color stability characteristics.

It will be understood that the above examples are merely illustrative and that the present invention broadly comprises stabilizing crude, water-insoluble polyvinyl butyral resins by subjecting them to the action of a preponderantly water solution maintained at a pH of 6.0–7.5 and an alkalinity of between 100 and 200, said solution, at least in the latter stage of the treatment, having dissolved therein a saturated aliphatic amine having two primary amino groups.

It will be evident from the foregoing Examples that the success of the present invention derives from the neutralization of the crude polyvinyl butyral resin in a water suspension whose hydrogen content and alkalinity is adjusted to a specific value and to the employment of a saturated aliphatic amine possessing two primary amino groups in conjunction with this water solution. Thus, if a pH appreciably in excess of 7.5 be present in the water suspension, during the process of stabilization the resin will develop a characteristic undesirable color. Further, in order that the stabilized resin shall possess satisfactory color characteristics, it is necessary to maintain the alkalinity of the water solution, as hereinafter defined, between a value of 100 to 200 during stabilization process. Likewise, in order that desirable color stability shall be acquired in a commercially feasible time, it is desirable that the pH of the suspension liquid should not fall below 6.0 during the indicated process. As a matter of practical operation, the water solution should be adjusted and maintained at a pH of 6.0–7.5 although a pH even in slight excess of 7.5 but below 8.0 can be tolerated.

The examples also illustrate that, although odorless resins may be obtained by neutralization at pH values below 8.0, satisfactory color stability will not result unless a saturated amine of the type herein considered in quantities greater than 0.04%, by weight of the resin, is present in the water solution during the stabilization treatment after the resin is substantially neutralized. Such amines adapted for use in the present invention include ethylenediamine, hexamethylenediamine, propylenediamine, triethylenetetramine and diethylenetriamine. Other water-soluble organic neutralizing agents such as diethyl cyclohexylamine, diphenyl guanidine, diphenyl amine, and the like may be employed in conjunction with the amines mentioned above provided the latter are present in the suspension medium in the concentration indicated.

Except for reasons of economy, an appreciable excess of the amine may be used; also, it may be added to the water solution at the beginning of the stabilization treatment although, in such instances, due allowance must be made for loss of effective amine concentration because of reaction with acid residues contained in the crude resin. However, to make the most effective and economical use of the amine, it is preferred to add the amine after the resin is substantially neutralized. In any event, the water solution must contain after the resin is substantially neutralized, at least 0.04% of a saturated aliphatic amine, by weight of the resin.

The sodium hydroxide employed in Example I and the sodium bicarbonate of Example II function as alkali neutralizing agents, serving to neutralize residual, occluded acid and to help stabilize the resin. The methyl acetate employed in Example I functions as a buffer material in order to permit the alkalinity of the solution to rise to a sufficient figure while the hydrogen ion concentration is maintained within the necessary limits. Other well known strong alkaline materials such as potassium hydroxide, trisodium phosphate and sodium carbonate in conjunction with other buffering materials such as sodium acetate may be substituted for the sodium hydroxide-methyl acetate combination of Example I. Furthermore, other single compounds such as sodium bicarbonate which themselves function both as buffering materials and alkaline neutralizing materials, i. e., sodium acetate, quaternary ammonium salts and the like, may be substituted for these materials. In any event, the alkaline neutralizing and buffering material used should be employed in a concentration which will maintain the dispersion medium at the proper hydrogen ion concentration and alkalinity level throughout the stabilization process. Obviously, the materials used as neutralizing and buffering agents should not discolor the resin, should not impart haze to the resin, and should be water-soluble.

The term "alkalinity" as used throughout this specification refers to the potential basic or alkaline characteristics of the aqueous dispersion medium. Because of the discussed buffering action present in the medium, alkalinity is not expressible in such terms as pH or hydroxyl ion concentration. Consequently, the term "alkalinity" as used herein is defined as the number of cubic centimeters of 0.01 normal hydrochloric acid required to neutralize 100 grams of the reaction suspension using bromphenol blue as the indicator. This value may be readily determined by neutralizing 5.0 grams of the suspension with 0.01 normal hydrochloric acid, using promphenol blue as the indicator.

The exact temperature employed during the stabilization process is not critical. The speed of stabilization is increased through the use of increased temperatures and, consequently, temperatures appreciably below 55° C., although not inoperative, are undesirable because of the extended period of time necessary for stabilization. On the other hand, the upper practical limits for temperature is that of the boiling point of water, i. e., 100° C. It has been found preferable to employ a temperature between 60° C. to 85° C. throughout the course of the stabilization.

The duration of the treatment of the resin cannot be defined within precise limits since it is dependent upon many variable conditions as well as the degree of stabilization necessary. In general, the treatment will be continued until the resin is satisfactorily stabilized as determined by testing samples taken from time to time during the course of the stabilization treatment. Once the minimum duration of the treatment is established for any given set of conditions, obviously testing of each batch will not be required. As pointed out above, the temperature of the water solution influences the duration of the treatment to obtain satisfactory stabilization of the resin. The physical form of the resin is another important factor since stabilization will proceed more rapidly with a finely divided resin as compared to a resin in the form of coarser particles. Again, the particular resin being treated and the method by which it has been prepared, may influence the time required for treatment. The specific examples show typical times for the stabilization of polyvinyl butyral resins in finely divided form.

The time required for treatment of the resin to bring it to a point where it is substantially neutralized also will vary considerably depending upon conditions. There is no necessity for establishing this point particularly accurately since there is no harm in adding the amine somewhat after the resin has been substantially neutralized or even before the resin is neutralized, providing in the latter case some excess of the amine is added as a safety factor. As shown in the examples, the resin is ordinarily substantially neutralized, so that it is economical to add the amine, after the treatment has gone on for about fifteen minutes or so.

Throughout this specification, the medium in which the polyvinyl acetal resin is suspended during stabilization has been referred to as a water or as a preponderantly water suspension medium. It is to be understood that this medium does not consist wholly of water and dissolved solid materials but may comprise adventitious liquid components resulting from previous processes to which the resinous condensation material has been subjected during its course of production. Such materials are exemplified by the methanol and butyraldehyde disclosed in Example I. Accordingly, the term "water suspension medium" or "preponderantly water suspension medium" when used in this specification shall be taken to mean a water solution composed mainly of water and which possesses a solvency reaction upon polyvinyl acetal resins substantially equivalent to that of water.

An advantage of the present invention is that it makes possible the production of polyvinyl btuyral resins exhibiting satisfactory color and odor characteristics. The invention further provides a satisfactory method for conducting a water suspension stabilization of polyvinyl butyral resins to yield a product possessing substantially no odor and satisfactory color stability characteristics. The stabilized resins of the present invention may be employed for all uses for which polyvinyl butyral resins are known to be useful, and are particularly well suited for use as ingredients in water proof coating compositions and the like where stable resinous materials possessing substantially no odor are required.

This application is a continuation-in-part of applicant's copending application Serial No. 513,627, filed December 9, 1943, and now abandoned, and entitled "Stabilization of polyvinyl acetal resins."

As many apparently widely different embodiments of this invention may be made without departing from the spirit and scope thereof, it is to be understood that the invention is not limited to the specific embodiments thereof except as defined in the appended claims.

I claim:

1. Process of treating a crude, water-insoluble polyvinyl butyral resin which comprises suspending said resin in finely divided form in a preponderantly water solution maintained at a pH of 6.0–7.5 and an alkalinity of between 100 and 200, said solution containing, after said resin is substantially neutralized, at least 0.04%, by weight of said resin, of a saturated aliphatic amine containing from 2 to 6 carbon atoms, inclusive, and having two primary amino groups.

2. Process of treating a crude, water-insoluble polyvinyl butyral resin which comprises suspending said resin in finely divided form in a preponderantly water solution maintained at a pH of 6.0–7.5, an alkalinity of between 100 and 200, and a temperature of 55° C.–100° C., said solution containing, after said resin is substantially neutralized, at least 0.04%, by weight of said resin, of a saturated aliphatic amine containing from 2 to 6 carbon atoms, inclusive, and having two primary amino groups.

3. Process of treating a crude, water-insoluble polyvinyl butyral resin which comprises suspending said resin in finely divided form in a preponderantly water solution maintained at a pH of 6.0–7.5 and an alkalinity of between 100 and 200, dissolving in said water solution after said resin is substantially neutralized, at least 0.04%, by weight of said resin, of a saturated aliphatic amine containing from 2 to 6 carbon atoms, inclusive, and having two primary amino groups, and further subjecting said resin to the action of said water solution until said resin is stabilized.

4. Process of treating a crude, water-insoluble polyvinyl butyral resin which comprises suspending said resin in finely divided form in a preponderantly water solution maintained at a pH of 6.0–7.5 and an alkalinity of between 100 and 200, dissolving in said water solution after said resin is substantially neutralized, at least 0.04%, by weight of said resin, of ethylenediamine, and further subjecting said resin to the action of said water solution until said resin is stabilized.

5. Process of treating a crude, water-insoluble polyvinyl butyral resin which comprises suspending said resin in finely divided form in a preponderantly water solution maintained at a pH of 6.0–7.5 and an alkalinity of between 100 and 200, dissolving in said water solution after said resin is substantially neutralized, at least 0.04%, by weight of said resin, of diethylenetriamine, and further subjecting said resin to the action of said water solution until said resin is stabilized.

GELU S. STAMATOFF.

REFERENCES CITED

The following references are of record in the file of this patent:

UNITED STATES PATENTS

| Number | Name | Date |
|---|---|---|
| 2,258,410 | Dahle | Oct. 7, 1941 |
| 2,282,026 | Bren | May 5, 1942 |
| 2,282,057 | Hopkins | May 5, 1942 |
| 2,332,896 | D'Alelio | Oct. 26, 1943 |

OTHER REFERENCES

Standard Methods for the Examination of Water and Sewage, pp. 64–66, 8th edition (1936), American Public Health Association, New York.

Certificate of Correction

Patent No. 2,456,462.  December 14, 1948.

GELU S. STAMATOFF

It is hereby certified that errors appear in the printed specification of the above numbered patent requiring correction as follows:

Column 1, line 10, for the word "ester" read *esters*; column 5, line 8, after "during" insert *the*; column 6, line 18, for "promphenol" read *bromphenol*; column 7, line 16, for "btuyral" read *butyral*;

and that the said Letters Patent should be read with these corrections therein that the same may conform to the record of the case in the Patent Office.

Signed and sealed this 12th day of April, A. D. 1949.

[SEAL]

THOMAS F. MURPHY,
*Assistant Commissioner of Patents.*